United States Patent [19]
Rauchhaus

[11] Patent Number: 6,035,723
[45] Date of Patent: Mar. 14, 2000

[54] TANK INSERT WITH A SENSOR UNIT

[75] Inventor: Günter Rauchhaus, Raunheim, Germany

[73] Assignee: Mannesmann VDO AG, Frankfurt, Germany

[21] Appl. No.: 09/108,603

[22] Filed: Jul. 1, 1998

[30] Foreign Application Priority Data

Jul. 11, 1997 [DE] Germany .......................... 197 29 699

[51] Int. Cl.$^7$ ...................................................... G01L 7/00
[52] U.S. Cl. ............................................................. 73/756
[58] Field of Search ............................ 73/715, 724, 756, 73/291, 299, 301; 220/203.19, 203.23, 203.24, 203.27

[56] References Cited

U.S. PATENT DOCUMENTS 4,796,676  1/1989  Hendershot et al. .................... 340/605
5,886,266  3/1999  Stiller et al. .............................. 73/756

FOREIGN PATENT DOCUMENTS 4423095  1/1996  Germany .

*Primary Examiner*—William Oen
*Attorney, Agent, or Firm*—Martin A. Farber

[57]  ABSTRACT

A sensor unit (3) insertable into a sensor receptacle (2, 23) of a tank insert (1), has at east one sensor (8), especially a pressure sensor that measures the internal pressure of a tank. In addition, the sensor includes connecting means (9), and is sealed off in the installed state by sealing means (11) and is secured by fastening means (7, 30). The components of the sensor are combined with its connecting and sealing means to form an assembly that can be inserted preassembled into the sensor receptacle (2, 23) and secured therein with sealing. In one version a retaining body (12) and in another version a housing (22) constitute the combining structural element that secures the sensor (8) indirectly in the tank insert (1).

20 Claims, 2 Drawing Sheets

TANK INSERT WITH A SENSOR UNIT

FIELD AND BACKGROUND OF THE INVENTION

The invention relates to a tank insert with a sensor unit, monitoring the tank internal pressure in particular, with the features of a sensor of internal tank pressure with connecting means, these being sealed off by dealing means and held by fastening means within a receptacle of the tank insert.

These features are known from German patent document DE 44 23 095 A1. According to this patent, a sensor receptacle in the shape of a cup and open to the interior of the tank is provided in a holder of a tank insert, with a pressure sensor inserted into the sensor receptacle. The sensor abuts a shoulder of the sensor receptacle by an annular seal and is secured therein by means of a clamping ring. The sensor receptacle is closed off on the outside by a cover which includes among other things a plug projection for the electrical contacts of the sensor.

There is a need for improvement in the mass production of this sensor unit. In particular, previously different parts such as the sensor itself (pressure measuring cell), seals, and retaining means can be assembled on the assembly line and the state of the sealing of the sensor receptacle and the correct function of the sensor unit can only be tested after the tank insert has been completely assembled. The time required on the assembly line and the probability of defects are relatively high because of the large number of operations.

SUMMARY OF THE INVENTION

The goal of the invention is to remedy the defects listed above.

This goal is achieved according to the invention by combining the sensor unit with the connecting and sealing means to form an assembly to be inserted in the sensor receptacle and fastened therein. Since the sensor unit together with the sealing means are assembled to form an assembly that is insertable, preassembled, into the sensor receptacle and can be fastened sealed off therein, the difficult handling of the individual parts of the sensor unit is displaced from the actual final assembly of the tank insert. In this way, the possibility of error is significantly reduced. In addition, the preassembled sensor unit can be placed away from the tank insert, for example in a tester, with a suitable receptacle adapter in order to perform the pressure and tightness tests in advance. All of this can be performed advantageously at the location of the manufacturer of the sensor. During final assembly, the complete sensor unit can then be installed mechanically and automatically in the tank insert.

A significant improvement in the sensor unit as far as assembly is concerned is achieved by eliminating worksteps: the combination of the sensor and its connecting means with a retaining body that simultaneously covers the sensor receptacle to protect it from the outside.

Conventional pressure sensors conlist of a round pressure measuring cell with a soldered connection. In a version that is especially striking from the design standpoint, the retaining body is therefore composed of a bottom that supports a plug connection for the electrical connection of the sensor and a boundary with the fastening means so that the sensor together with its connection can be placed in the retaining body by a few maneuvers.

When the sensor is releasably mounted in the retaining body by using shapewise fastening means, the sensor unit is especially simple to assemble, by clipping for example. Its parts can then also easily be separated from one another in the event of damage.

With the same advantages, the sensor unit is secured in the sensor receptacle, likewise preferably by means of a releasable clip latch. Preferably clip hooks or latching noses are provided on the receiving part, in other words on the retaining body and/or the sensor receptacle, but if necessary the retaining body can also include the fastening means to hold it in the sensor receptacle for example.

Advantageously, an economical use of material is achieved if the sensor receptacle is formed by a bottom provided with at least one opening and by elastic clip hooks projecting freely from the bottom and distributed as a lateral boundary around its circumference instead of a continuous closed wall.

Especially in regard to pressure measurement, it is advantageous for the sensor unit to form, together with the sealing means, a pressure-tight lid for an opening of a tank insert that terminates in the sensor receptacle, because then the insertion of the sensor unit and the sealing process can be accomplished especially efficiently manually or by machine, using a robot.

Instead of or in combination with the above releasable shapewise fastening, the retaining body and/or the entire sensor unit together with the sensor receptacle can be connected permanently materialwise if necessary, by welding or gluing for example. This is done for example when another type of fastening might be too unstable because of the high operating stress. In a combination the latch serves only for preassembly and gluing or welding ensures an especially strong final connection. The same applies when there is a corresponding need to connect the retaining body and the sensor, which likewise does not necessarily have to be made releasable.

In one variation on the embodiment, the sensor unit, which can be preassembled, is placed in a two-piece housing instead of the retaining body. The housing can be inserted into a sensor receptacle in the tank insert that is made as a simple recess and fastened therein. This has the advantage that the tank insert can be considerably simplified by contrast with the prior art recited at the outset; in particular, for example, tank inserts can be made with the same design with and without the sensor unit, with the recess initially being sealed by a lid that can be broken out or cut out prior to the possible insertion of the sensor unit. The housing is preferably provided with a circumferential flange that fits over the edge of the abovementioned recess and can be welded fluid-tight thereto.

It is extremely important that the sensor be held with zero play in the sensor unit, for example with a slight pretensioning produced by elastic means. This prevents the sensor, in the event of vibrations or oscillations acting on it, from moving relative to its fixed connection and the latter being damaged over time.

BRIEF DESCRIPTION OF THE DRAWINGS

Further details and advantages of the subject of the invention follow from the drawing of embodiments and their detailed descriptions.

Only a small portion of the tank insert itself can be seen in the FIGURES. For a closer representation and description of its function, reference is made to the prior art recited at the outset whose disclosure is incorporated herein in terms of content.

DETAILED DESCRIPTION OF THE PREFERRED EMBODIMENTS

Figure 1:
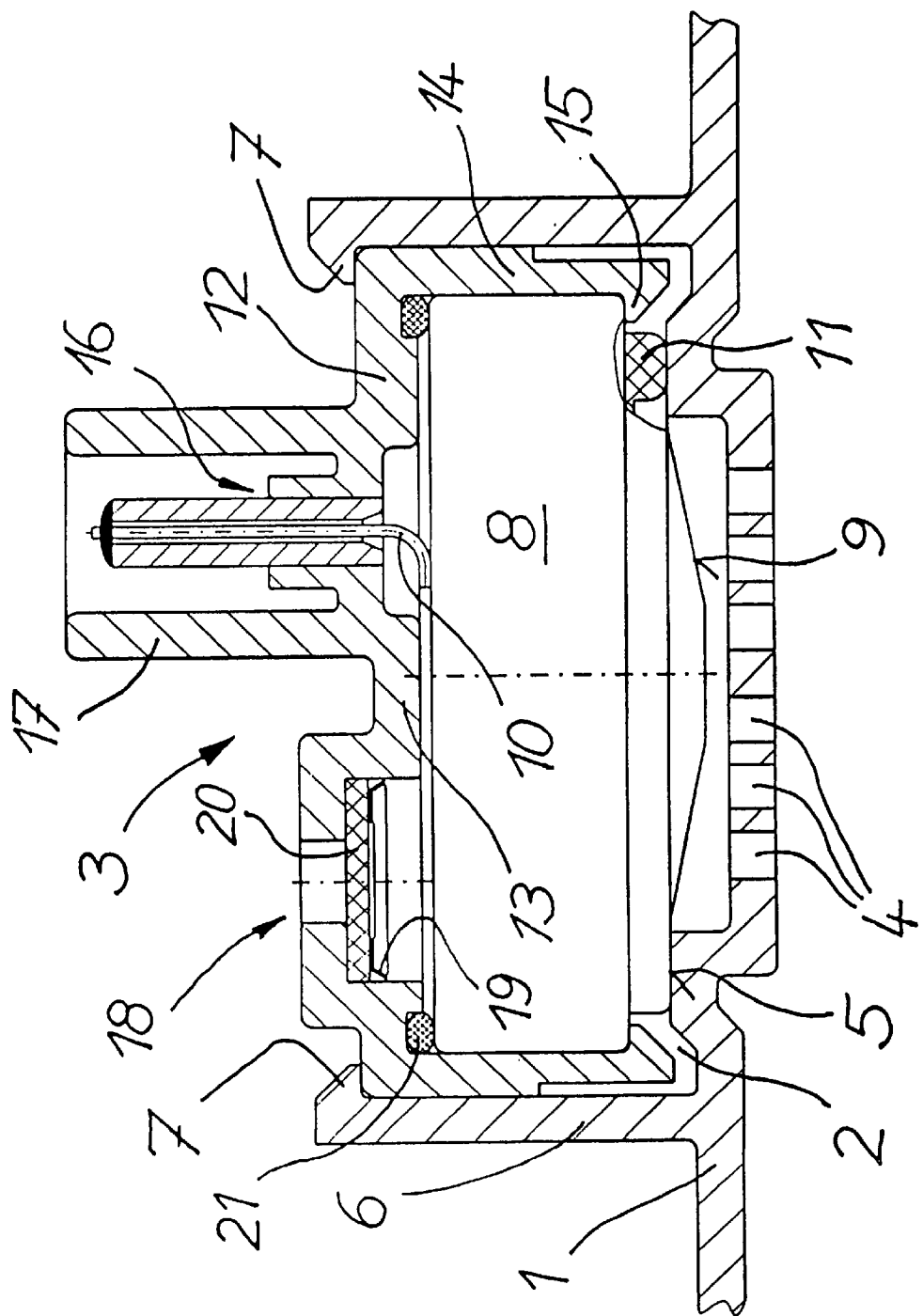
FIG. 1 shows a section through a first embodiment of the sensor receptacle with the sensor unit installed therein.

A sensor receptacle 2 for insertion of a preassembled sensor unit 3 is permanently formed on the tank insert 1 merely indicated in FIG. 1. The bottom of the sensor receptacle 2 has one or more openings 4 that form a connection to the interior of the tank in the shape of flow channels. They are surrounded by a flat smooth sealing shoulder 5. A radial boundary 6, surrounding the sealing shoulder, of the sensor receptacle can be formed by a flange or collar that projects freely from its bottom.

For shapewise securing of the sensor unit, boundary 6 is equipped with latching noses or clip hooks 7 as fastening means. It is therefore not absolutely necessary to make the flange as a circumferential wall. Instead, the preassembled sensor unit can also be formed by a plurality of clip hooks distributed individually around the circumference of the sensor receptacle. This results in a saving of material over a continuous wall. Moreover the clip or latch type of fastening promotes the mechanization of the assembly of the sensor unit.

The boundary in this version however could also be made of the jacket surface of a cup molded on tank insert 1, and the sensor unit together with the retaining body could be secured therein by a clamping ring, i.e. analogously to the recited prior art. Another fastening variation, welding the sensor unit to the tank insert instead of latching, is also possible.

The sensor unit 3, as a preassembled module, comprises the sensor 8 itself, in this case a pressure sensor and/or a pressure measuring cell, with a pressure-receiving area 9 and a connecting side facing away from the latter, with an electrical connection 10 incorporating all of the necessary supply and signal poles. The pressure-receiving area 9 is surrounded edgewise by a soft elastic (ring-)seal 11 that can be permanently attached to sensor 8. If the pressure-receiving surface 9 is formed or sealed off by an elastic membrane in known fashion, the latter can be made integral with the seal 11.

The sensor unit 3 also includes a retaining body 12 as a receptacle for the sensor 8 and its connection 10. The retaining body 12 consists of a bottom 13 and, as in the case of sensor receptacle 2, of a boundary 14 that is radial and projects from bottom 13 with integral latching noses or clip hooks 15. The internal dimensions of the boundary 14 correspond to the outer dimensions of the sensor. The clip hooks can once again be distributed individually to stand around the circumference but the bottom is made as an essentially closed surface with a circumferential edge in order to cover the sensor receptacle from the outside.

In the bottom 13, in addition to a hole 16 for the connection 10 and a corresponding plug projection 17 that points away from the sensor, an additional opening 18 is provided. In it, by means of a clamping ring 19, a membrane 20 is secured whose purpose will be explained below. The connection 10 and the plug connection 17 are also referred to in combination as connecting means 10, 17.

During the preassembly of the sensor unit 3, the sensor 8 is inserted with its connecting side pointing forward into the chamber of retaining body 12 that is surrounded by the bottom 13 and the boundary 14. Its connecting side is then located directly opposite the inside of the bottom 13, and is supported at its outer edge or circumference by a soft elastic sealing ring 21 against the bottom 13 and maintains a slight distance from the latter. It communicates on this side with the environment through the membrane 20 so that on the connecting side of the sensor 8, the current ambient pressure is always available as a reference pressure for measurement. The membrane itself is permeable to air but does not pass fluid. It can be made of Teflon for example or of a material known as Klimafolie.

The pressure-receiving surface 9 is exposed and is gripped positively at its outer circumferential edge by the clip hooks 15 of the retaining body 12. The sealing ring 21 can compensate to a slight extent for manufacturing-related variations in dimensions between the height of the sensor 8 and the distance between the clip hooks 15 and the bottom 13. In addition, it prevents the entry of water or other fluids into the area between the membrane 20 and the connecting side of the sensor 8 and abuts the latter with zero play. The connection 10 is introduced into the plug projection 17 through opening 15 with a seal and is soldered therein.

The preassembly of the sensor unit 3 is thus complete. Now, as mentioned at the outset, it can be inserted as a unit into a tester with an adapter that corresponds to the sensor receptacle 2 and can be tested for tightness and function following the addition of electrical contacts.

To complete the tank insert 1, the preassembled sensor unit 3 together with the exposed pressure-receiving surface 9 at the front is inserted into its sensor receptacle 2. The seal 11 rests on the sealing shoulder 5 of the sensor receptacle 3 and is compressed to the point where the clip hooks 7 at the lateral boundary of the sensor receptacle can fit behind the outer circumferential edge of the retaining body 12 and secure the sensor unit 2 releasably. This process can be mechanized using a robot.

The pressure-receiving surface 9 communicates through the openings 4 fluidically with the interior of the tank and is exposed to its internal pressure. The seal 11 keeps disturbing influences away.

In the final state, therefore, the sensor 8 is secured in the sensor receptacle 2 indirectly by the retaining body 12. To begin its function, the tank insert 1 is fastened to the tank and the electrical connection is formed by the plug projection 17. If there is any damage the entire sensor unit 3, following release of the latch by the clip hooks 7 and of the electrical connecting plug, can be completely removed as a unit and quickly replaced.

Figure 2:
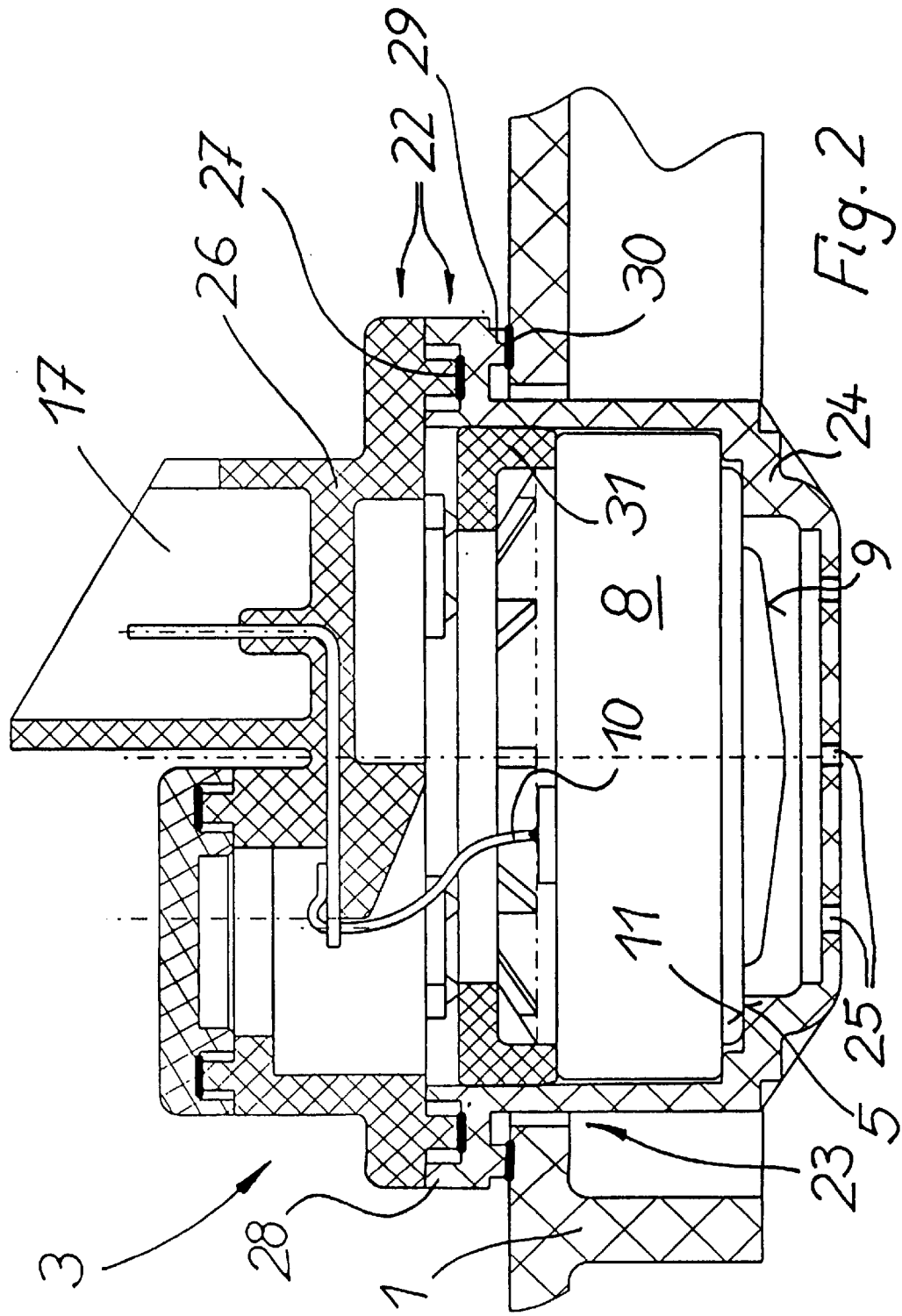
FIG. 2 is a section through a second embodiment in which the sensor receptacle of the tank insert is further simplified and the sensor unit is preassembled in a two-piece housing.

According to FIG. 2, the sensor unit 3 is encapsulated in a two-piece housing 22 and also comprises, by comparison with the above design, components of the sensor receptacle 2 according to FIG. 1. As a result, the equipment on the tank is further reduced from that shown in FIG. 1 since only a recess that serves as the sensor receptacle 23 is required for inserting and fastening the sensor unit 3. The housing 22, which takes the place of the retaining body 12, by comparison with the first embodiment, includes a bottom cup 24 with bottom openings 25 therein. This cup takes the place of the perforated bottom and the lateral boundary 6 of the sensor receptacle 2 and is connected permanently with a housing lid 26 by welding (the housing welded seam 27). At its upper outer edge, the bottom cup has a flange 28 with a circumferential rib 29 that is formed on its underside. In order to achieve especially reliably tight fastening, the rib 29 is welded pressure-tight to the edge of the sensor receptacle 23, preferably by friction welding. The circumferential welded seam 30 is therefore a fastening means and sealing means by analogy with the sealing ring 21 according to FIG.

1 so that, with the structure of FIG. 2, a separate seal is unnecessary. As in the first version, the pressure-receiving surface of the sensor 3 is connected by the openings 25 with the tank interior and is sealed off edgewise by the seal 11.

The sensor 8 is tensioned and sealed off between the bottom cup 24 and the housing lid 26 that supports the plug projection 17, with slight pretensioning inside the housing, by analogy with the supporting function of the sealing ring 21 in FIG. 1, being built up by an elastic intermediate piece 31 that is annular in this case in order to hold the sensor 8 with zero play and to protect it against undesired vibrations and relative movements with respect to the fixed connection 10. Its pressure-receiving surface 9 is again surrounded by the seal 11 that rests on a sealing shoulder 5 of the bottom cup 24 and it communicates fluidically through the openings 25 with the interior of the tank, while on its connecting side ambient pressure is applied through a membrane not shown here. Additionally, the structure of the sensor unit 3, as is readily apparent from the drawing, is functionally equivalent to the version in FIG. 1 so that there is no need to dwell on this further.

In contrast to the view in FIG. 2, shapewise releasable connecting means can be provided between the bottom cup 24 and the housing lid 26 similarly to the retention of the sensor 8 in the retaining body 12. A combination of shapewise and materialwise connection is possible.

This version of the sensor unit is also completely preassembled, tested, and delivered to the assembly line ready to connect to the tank insert, and is welded there to the edge of the recess 23, preferably by friction welding.

In a version not shown, the housing is latched shapewise similarly to the retaining body 12 in FIG. 1 by means of releasable fastening means in the sensor receptacle 23; however, an additional measure for sealing any gaps would be necessary in this case.

I claim:

1. Tank insert with a sensor unit comprising:
   at least one sensor which detects tank internal pressure;
   connecting means for making electrical connection to the sensor unit;
   sealing means for sealing the sensor unit to the tank insert; and
   fastening means for holding the sensor unit in a sensor receptacle of the tank insert;
   wherein the sensor unit is combined with the connecting means and the sealing means to form an assembly insertable preassembled into the sensor receptacle and fastened therein.

2. Tank insert according to claim 1, wherein said sensor unit comprises a retaining body that combines said sensor and said connecting means to form said assembly for insertion into said sensor receptacle, said retaining body covering said sensor receptacle externally.

3. Tank insert according to claim 2, wherein said retaining body includes a plug projection for said sensor, and has a bottom which supports said plug projection and a lateral boundary that projects therefrom, said retaining body including fastening means formed thereon; and
   wherein said sensor is insertable into a space surrounded by the bottom and the boundary of said retaining body, and said connection is insertable into said plug projection of the bottom of said retaining body.

4. Tank insert according to claim 2, wherein said retaining body comprises fastening means that secure said sensor releasably and in shapewise fashion.

5. Tank insert according to claim 1, wherein said sensor receptacle has fastening means that secure said sensor unit releasably and in shapewise fashion.

6. Tank insert according to claim 5, wherein said sensor receptacle comprises a bottom provided with at least one opening, and elastic clip hooks distributed around a circumference of said receptacle to serve as a lateral boundary of said receptacle, said hooks projecting freely from said bottom.

7. Tank insert according to claim 4, wherein said releasable shapewise fastening means have the form of latching noses or clip hooks.

8. Tank insert according to claim 1, wherein said sensor unit plus said sealing means form a pressure-tight lid for an opening of tank insert, and said pressure tight lid terminates in said sensor receptacle.

9. Tank insert according to claim 1, wherein said sensor receptacle is a simple recess, and said sensor unit comprises an insert and a tight lid for said recess and a housing which is in contact on a bottom side of said recess for receiving a parameter to be sensed.

10. Tank insert according to claim 9, wherein said housing comprises a bottom cup, a plug connection for said connecting means, and a housing lid that supports said plug projection, wherein said bottom cup and said housing lid enclose a sensor between them.

11. Tank insert according to claim 10, wherein said bottom cup and said housing lid are welded pressure-tight to one another with a weld seam.

12. Tank insert according to claim 10, wherein said connecting means are operative in shapewise fashion and are provided between said bottom cup and said housing lid.

13. Tank insert according to claim 1, further comprising elastic means, wherein said sensor is secured with zero play in said sensor unit by said elastic means.

14. Tank insert according to claim 11, wherein said sensor unit is connected nonreleasably with the sensor receptacle.

15. Tank insert according to claim 1, wherein said sensor is a pressure sensor.

16. Tank insert according to claim 9, wherein said parameter is a pressure, and said recess has at least one opening to receive said parameter.

17. Tank insert according to claim 11, wherein said seam is a friction-welding seam.

18. Tank insert according to claim 13, wherein said elastic means comprises a seal and a sealing ring disposed on opposite sides of said retaining body and in contact with said receptacle.

19. Tank insert according to claim 13, wherein said housing comprises a bottom cup, a plug connection for said connecting means, and a housing lid that supports said plug projection, wherein said bottom cup and said housing lid enclose a sensor between them; and
   said elastic means comprises an intermediate piece disposed between said sensor and said housing lid, said intermediate piece contacting said receptacle.

20. Tank insert according to claim 17, wherein said sensor unit is connected nonreleasably by welding or gluing with said receptacle.

* * * * *